United States Patent
Li et al.

(10) Patent No.: US 7,486,645 B2
(45) Date of Patent: Feb. 3, 2009

(54) OBTAINING DATA RATES FOR MOBILE STATIONS BASED ON A FORWARD LINK OF A CELLULAR SYSTEM

(75) Inventors: Shupeng Li, Edison, NJ (US); Sudhir Ramakrishna, New York, NY (US); Ashok Narasimhaiya Rudrapatna, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 427 days.

(21) Appl. No.: 11/298,301

(22) Filed: Dec. 9, 2005

(65) Prior Publication Data
US 2007/0133476 A1 Jun. 14, 2007

(51) Int. Cl.
*H04B 7/216* (2006.01)

(52) U.S. Cl. .................. 370/335; 370/339; 370/341; 370/342

(58) Field of Classification Search .......... 455/436–453
See application file for complete search history.

(56) References Cited
U.S. PATENT DOCUMENTS 6,845,239 B1 * 1/2005 Sato et al. ............... 455/456.1
7,142,861 B2 * 11/2006 Murai ....................... 455/444
2004/0202146 A1 * 10/2004 Lee ............................. 370/350
2007/0070944 A1 * 3/2007 Rinne et al. ................ 370/329
2007/0087698 A1 * 4/2007 Lee ............................. 455/69

OTHER PUBLICATIONS

"Spatial Division Multiple Access (SDMA) Impact on AT DRC Predictor", by Shupeng Li and Ashok Rudrapatna.
"Spatial Division Multiple Access (SDMA) Enhancements for HRPD Revision B", by Sridgar Gollamudi, et al; 2rd Generation Partnership Project 2.

* cited by examiner

*Primary Examiner*—Duc Nguyen
*Assistant Examiner*—Dai A Phuong

(57) ABSTRACT

The present invention provides a method and an apparatus for adapting a data rate that a mobile station indicates to a base station for transmission on a forward link in a cellular system. The method comprises measuring a first value indicative of strength of at least one of a primary and a secondary pilot. The method further comprises compensating the first value indicative of strength of the pilot based on an offset to select a second value indicative of the data rate for the base station. The base station may determine an offset value for compensation and send an indication to the mobile station during the setup of the mobile station. When the mobile station connects to the base station, a measurement of a channel condition (i.e., pilot) may determine a revised data rate for transmission of a next data packet on the forward link.

20 Claims, 5 Drawing Sheets

OBTAINING DATA RATES FOR MOBILE STATIONS BASED ON A FORWARD LINK OF A CELLULAR SYSTEM

FIELD OF THE INVENTION

This invention relates generally to telecommunications, and more particularly, to wireless communications.

DESCRIPTION OF THE RELATED ART

Wireless communications systems or mobile telecommunication systems typically provide different types of services to various users or subscribers of wireless communication devices. The wireless communication devices may be mobile or fixed units and situated within a geographic region across one or more wireless networks. The users or subscribers of wireless communication devices, such as mobile stations (MSs) or access terminals or user equipment may constantly move within (and outside) particular wireless networks.

A wireless communications system generally includes one or more base stations (BSs) that can establish wireless communications links with mobile stations. Base stations may also be referred to as node-Bs or access networks. To form the wireless communications link between a mobile station and a base station, the mobile station accesses a list of available channels/carriers broadcast by the base station. To this end, a wireless communications system, such as a spread spectrum wireless communications system, may allow multiple users to transmit simultaneously within the same wideband radio channel, enabling a frequency re-use based on a spread spectrum technique.

Many cellular systems, for example, spread-spectrum cellular systems use a Code division multiple access (CDMA) protocol to transmit data in a wireless network consistent with a desired standard, such as IS-95, CDMA2000 or Universal Mobile Telecommunication System (UMTS) based wideband-CDMA (WCDMA). A spread-spectrum cellular system generally provides transmissions associated with one or more mobile stations that a base station may be serving on the downlink (a.k.a. forward (FL) link). As such, transmissions from the mobile stations to the base station may occur on the uplink (a.k.a. reverse link (RL)). Likewise, on the reverse link (RL), one or more mobile stations may communicate with a base station serving the mobile stations.

For establishing a wireless communication in a cellular system, a base station (BS) schedules the transmissions of the various mobile stations (MSs) that it is serving on the MS-to-BS (reverse link, RL). To this end, a base station may provide channels that have different capabilities to the mobile stations on the BS-to-MS link (forward link, FL). For example, a base station in an Evolved, Data-Optimized (EVDO) network may provide channels that operate according to an EVDO Revision A protocol, an EVDO Revision B protocol, or both. EVDO Revision B is an upgraded version of EVDO Revision A, and provides a number of air interface enhancements to traffic channels, control channels, and access channels that operate according to EVDO revision B. Legacy mobile stations that operate according to an EVDO Revision A protocol may establish wireless communications links with the base station using one of the channels that operates according to the EVDO Revision A protocol. Newer mobile stations may be capable of establishing wireless communications links according to either the EVDO Revision A protocol or the EVDO Revision B protocol.

For example, a Spatial Division Multiple Access (SDMA) protocol in the 3rd Generation (3G) Partnership Project (3GPP2) standards enhances the current Revision A standard for an Access Node (AN) or more generically Base Station (BS) and/or access terminals (AT) or more generically mobile stations (MS). To enable a SDMA enhancement, one or more secondary pilots may be used to cover a portion of a sector. In particular, for 3GPP2 Revision A standard, access terminals (AT) or more generically mobile stations (MS) use pilot strength to select forward link (AN-AT link) data rates via data rate control (DRC) messages on the Reverse Link (RL). A rate value is fed back to an AN or a BS. An AT or the MS sends a request for a data rate to the AN or the BS to transmit at that data rate in the next transmission.

To request a data rate control (DRC) value, in a wireless communication system based on a SDMA protocol of the Revision B standard, an access terminal (AT) may measure the strength of a secondary pilot instead of a primary pilot of the Revision A standard. Moreover, the secondary pilot carrier-to-interference ratio (C/I) and the actual traffic channel C/I transmitted to the AT may be different. In some cases the difference can be as large as 6 decibels (dB). Such difference may cause convergence to take a long time during an initial phase of data rate selection by the AT, sometime as long as several seconds. That is, the data rates selected by the AT may not quickly converge to an optimal date rate that may be desired for transmission from a base station based on the transmit power of a traffic channel over a forward link.

However, the slow convergence may introduce relatively long convergence time, which may adversely affect the system performance. For example, the long convergence time may result in lower sector aggregated throughputs in a wireless communication system.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method is provided for adapting a data rate that a mobile station indicates to a base station for transmission on a forward link in a cellular system. The method comprises measuring a first value indicative of strength of at least one of a primary and a secondary pilot. The method further comprises compensating the first value indicative of strength of the pilot based on an offset to select a second value indicative of the data rate for the base station.

In another embodiment of the present invention, a method is provided causing a first data rate selected by a mobile station to converge to a second data rate in a cellular system. The method comprises transmitting an indication of offset from a base station to the mobile station for compensating a measurement of a pilot.

BRIEF DESCRIPTION OF THE DRAWINGS

The invention may be understood by reference to the following description taken in conjunction with the accompanying drawings, in which like reference numerals identify like elements, and in which.

Figure 1:
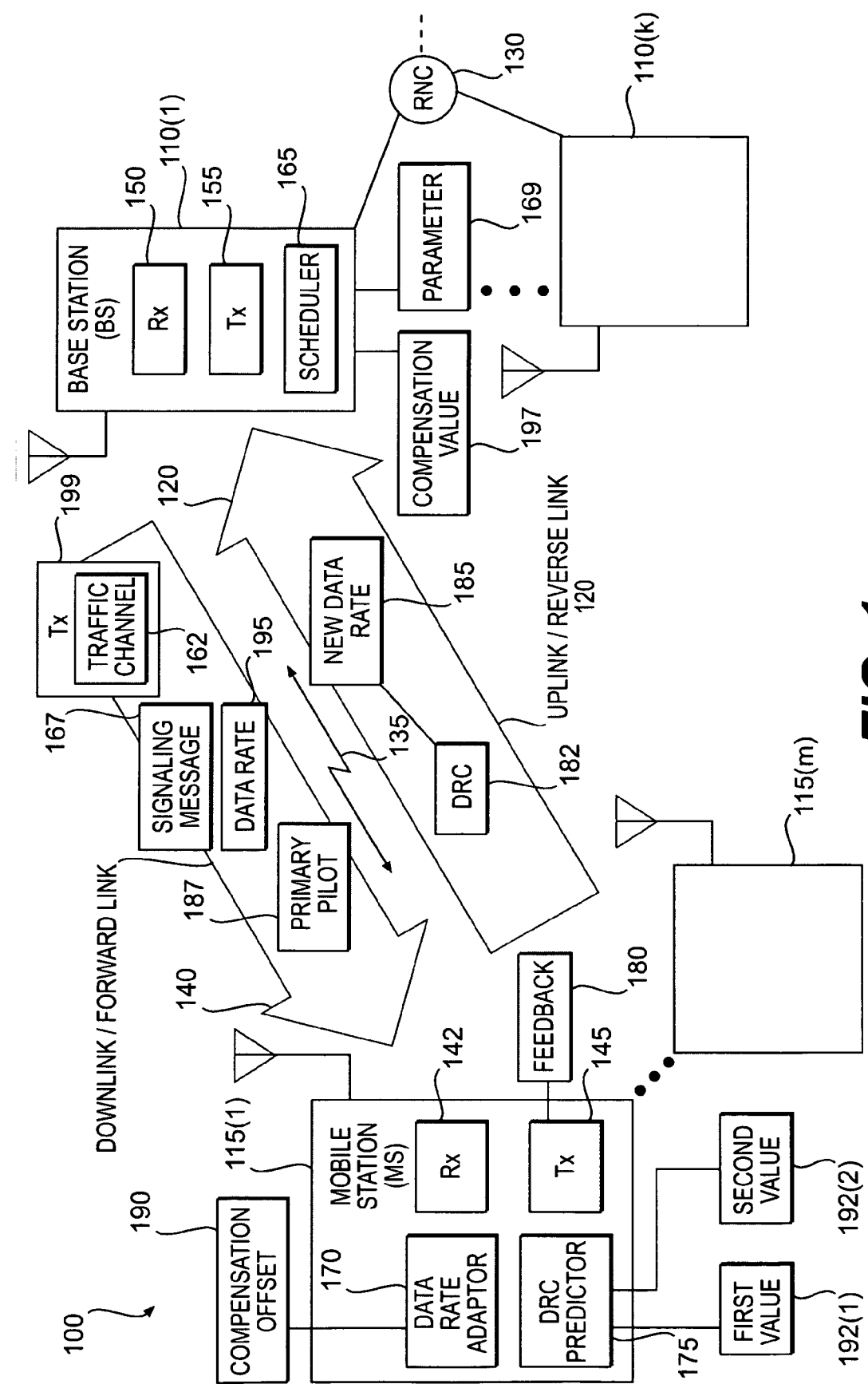
FIG. 1 schematically depicts a cellular system in which an initial data rate selected by a mobile station may converge to a data rate corresponding to the power of a traffic channel on a forward link so that a base station may transmit data based on one or more instantaneous channel conditions according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for obtaining data rates for mobile stations based on a forward link in a cellular system. By adapting a data rate that a mobile station indicates to a base station for transmission on a forward link, the base station may transmit data on the forward link based on one or more instantaneous channel conditions. The method comprises measuring a first value indicative of strength of a primary pilot. The method further comprises compensating the first value indicative of strength of the primary pilot based on an offset to select a second value indicative of the data rate for the base station. For example, the mobile station may measure a primary or secondary pilot strength. When the mobile station connects to the base station, a measurement of a channel condition (i.e., pilot) may determine a revised data rate for transmission of a next data packet on the forward link. The mobile station may transmit a data rate request on the reverse link using a data rate control channel. Upon the receipt of the request, the base station may use the revised data rate on the forward link for the traffic channel when transmitting packets to the mobile station in the next transmission. Accordingly, the mobile station may provide a data rate control that may adapt the selected data rate in the forward link to at least one varying radio channel condition. In a cellular system, an initial data rate selected by a mobile station may converge to a data rate corresponding to the power of a traffic channel on a forward link so that a base station may transmit data based on one or more instantaneous channel conditions.

Referring to FIG. 1, a cellular system 100 is illustrated to include a plurality of mobile stations (MSs) 115(1-$m$) and a set of base stations (BSs) 110(1-$k$) for converging an initial selection of a data rate to a desired data rate by the mobile station 115(1) according to one embodiment of the present invention. To obtain the desired data rate, the mobile station 115(1) may compensate a measurement of at least one varying radio channel condition associated with transmission to the mobile station 115(1). By compensating the measurement, the mobile station 115(1) may adapt the selected data rate indicated to the base station 110(1) for transmission thereto. The set of base stations 110(1-$k$) may provide the wireless connectivity to the mobile station 115(1) according to any desirable protocol. Examples of a protocol include a code division multiple access (CDMA, CDMA2000) protocol, wideband-CDMA (WCDMA) protocol, a Universal Mobile Telecommunication System (UMTS) protocol, a Global System for Mobile Communications (GSM) protocol, a Spatial Division Multiple Access (SDMA), protocol, and the like.

Examples of the mobile stations 115(1-$m$) may include a host of wireless communication devices including, but not limited to, cellular telephones, personal digital assistants (PDAs), and global positioning systems (GPS) that employ the cellular system 100 to operate in a high-speed wireless data network, such as a digital cellular CDMA network. Other examples of the mobile stations 115 (1,m) may include smart phones, text messaging devices, and the like.

Consistent with one embodiment, the mobile station 115 (1) may transmit messages to the base station 110(1) over a reverse link 120. To enable a user of the mobile station 115(1) to communicate in the cellular system 100, a radio network controller (RNC) 130 may be coupled to the base station 110. In the cellular system 100, a wireless communication between the base station 110(1) and the mobile station 115(1) may occur over an air interface 135 via a radio frequency (RF) medium that may use a code division multiple access (CDMA) protocol to support multiple users. A forward link 140 may provide messages to the mobile station 115(1). The messages may include traffic packets and signaling messages over a relatively high-speed wireless data network, such as a cellular network When moving within a high-speed wireless data network, such as a digital cellular CDMA network, a handover of mobile communications occurs for the mobile station 115(1) upon a user leaving an area of responsibility of a first cell, namely, into a new cell. This handover may be coordinated by the radio network controller 130. The radio network controller 130 may coordinate the handover of mobile communications upon a user leaving an area of responsibility of a first base station 110(1), into a second base station 110($k$).

To communicate with different base stations 110(1-$k$), the mobile station 115(1) may comprise a receiver (RX) 142 and a transmitter (TX) 145. While the receiver 142 may receive transmissions of packet data from the set of base stations 110(1-k), the transmitter 145 may transmit packet data to the set of base stations 110(1-k) may be associated with a different cell sector of a base station.

For the purposes of providing signaling and for transmitting the packet data, the base station 110(1) of the set of base stations 110(1-k) may comprise a receiver (RX) 150 and a transmitter (TX) 155 in one embodiment of the present invention. While the receiver 150 may receive transmissions of packet data from the mobile stations 115(1-m), the transmitter 155 may transmit packet data and signaling messages.

The base station 110(1) may use the desired data rate for transmission over a traffic channel 162 to the mobile station 115(1). To this end, the base station 110(1) may further comprise a scheduler 165 to schedule user transmissions of the packet data based on a data rate on the forward link 140 to a set of mobile stations 115(1-m) that the base station 110(1) may be serving. By using the scheduler 165, the base station 110(1) may schedule user transmissions of packet data to the set of mobile stations 115(1-m).

The mobile station 115(1) may further comprise a data rate adaptor 170 and a data rate control (DRC) predictor 175. The data rate adaptor 170 may configure at least one parameter, e.g., a data rate, of the mobile station 115(1) to obtain one or more adjustments, e.g., an adjustment to a measurement of a pilot signal. The data rate adaptor 170 may enable the mobile station 115(1) to select a data rate 185 for the next scheduling period. By applying one or more compensation to the measurement of the pilot signal, the mobile station 115(1) may feedback 180 a revised, e.g., correct or new data rate 195 predicted by the DRC predictor 175. In this way, the base station 110(1) may use the feedback 180 to transmit data to the mobile station 115(1) at the revised data rate 195 selected by the mobile station 115(1).

According to one embodiment, the data rate adaptor 170 may measure one or more instantaneous channel conditions to indicate an optimized data rate even if the mobile station 115(1) may use a SDMA protocol. In the SDMA protocol, the mobile station may determine the desired forward link rate, i.e., the revised data rate 195 based on the measurement of the secondary pilot instead of a primary pilot 187. The base station 110(1) may use the desired forward link rate to transmit data over a downlink or the forward link (FL) 140. Instead of relying only on an open loop and/or closed loop adjustment, the mobile station 115(1) may predict the revised data rate 195 correctly based on a compensation offset 190.

Consistent with one embodiment, the mobile station 115(1) may use an indication of an offset value for the compensation offset 190 may be based on an antenna configuration of the base station 110(1) to compensate a measurement of signal strength of the primary pilot 187 and/or the secondary pilot. For example, the antenna configuration of the base station 110(1) may be based on one or more spatial beams formed at the base station 110(1). Based on the compensated measurement of the primary pilot 187, e.g., the mobile station 115(1) may provide an aggressive feedback within the feedback 180 for the data rate 185 such that the base station 110(1) may transmit at a relatively higher rate.

In operation, the data rate adaptor 170 may measure a first value 192(1) indicative of the strength of the primary pilot 187 and/or the secondary pilot. The base station 110(1) may provide the compensation offset 190 during an initial setup of the mobile station 115(1). For the purposes of causing the data rate 185 selected by the mobile station 115(1) to converge to the revised data rate 195, the base station 110(1) may transmit the compensation offset 190 to the mobile station 115(1) to compensate the measurement of the primary pilot 187 and/or the secondary pilot. Based on the compensation offset 190, the data rate adaptor 170 may compensate the first value 192(1) to select a second value 192(2) indicative of the revised data rate 195 for the base station 110(1) to transmit to the mobile station 115(1). Using the compensated first value 192(1), the DRC predictor 175 may predict the second value 192(2) for the revised data rate 195 based on a compensation value 197.

The mobile station 115(1) may set the compensation offset 190 based on the compensation value 197. To determine a value indicative of the revised data rate 195 during a working mode of the mobile station 115(1), the data rate adaptor 170 may add the compensation value 197 to the second value 192(2) indicative of the strength of the primary pilot 187 and/or the secondary pilot.

The base station 110(1) may determine the compensation value 197 for the compensation offset 190 based on a number of spatial beams formed at the base station 110(1). The base station 110(1) may transmit the compensation value 197 to the mobile station 115(1) in a signaling message 167 over the forward link 140 during setup of the mobile station 115(1). Alternatively, the base station 110(1) may periodically broadcast a parameter 169 associated with the offset 190 in the signaling message 167.

The mobile station 115(1) may send the feedback 180 on an uplink and/or a reverse link (RL) 120 to the base station 110(1) to indicate the value of the revised data rate 195. The base station 110(1) may receive the feedback 180 for data rate control over the reverse link 120 on a data rate control channel (DRC) 182. In response to the feedback 180 associated with the measurement of the primary pilot 187 and/or the secondary pilot which is compensated based on the offset 190, the base station 110(1) may enable the data rate 185 selected by the mobile station 115(1) to converge to the revised data rate 195 consistent with a transmit power of a traffic channel 162 on the forward link 140. The base station 110(1) may use the revised data rate 195 for scheduling a next transmission 199 over the traffic channel 162 to the mobile station 115(1).

One example of the high-speed wireless data network includes a digital cellular network based on a CDMA protocol, such as specified by the 3rd Generation (3G) Partnership Project (3GPP2) specifications. The 3G cellular systems provide enhanced voice capacity and support high data rate packet based services. These features are provided in cdma2000 1xEV high rate packet data air system referred to as IS-856. The 3G cellular system cdma2000 1xEV provides high-speed wireless Internet access to mobile users with asymmetric data traffic relative to a cellular system based on IS-95 standard. For example, data rate of a user of the mobile station 115(1) may very from 9.6 kbps to 153.6 kbps.

The base station 110(1), sometimes referred to as Node-B, may provide connectivity to associated geographical areas within the high-speed wireless data network. The base station 110(1) may transmit traffic packets, such as data packets. For example, traffic packets may include voice information, images, video, data requested from an Internet site, and the like. In contrast, signaling messages may be used to provide commands to each mobile station 115 and/or other elements of the cellular system 100. Examples of the signaling messages may include configuration messages, setup instructions, switch instructions, handoff instructions, and the like.

In the cellular system 100, a wireless data network may deploy any desirable protocol to enable wireless communications between the first and second base stations 110(1-k) and the mobile stations 115(1-m) according to any desirable protocol. Examples of such a protocol include a (CDMA, WCDMA) protocol, a UMTS protocol, a GSM protocol, and like. The radio network controller (RNC) 130 may be coupled to the first and the second base stations 110(1) and 110(k) to enable a user of the first and second mobile stations 115(1,m) to communicate packet data over a network, such as a cellular network. One example of the cellular network includes a digital cellular network based on a CDMA protocol, such as specified by the 3rd Generation (3G) Partnership Project (3GPP) specifications.

Other examples of such a protocol include a WCMDA protocol, a UMTS protocol, a GSM protocol, and like. The radio network controller 130 may manage exchange of wireless communications between the mobile stations 115(1-m) and the first and second base stations 110(1-k) according to one illustrative embodiment of the present invention. Although two base stations 110(1-k) and one radio network controller 130 are shown in FIG. 1, persons of ordinary skill in the pertinent art having benefit of the present disclosure should appreciate that any desirable number of base stations 110 and radio network controllers 130 may be used.

Each of the first and second base stations 110(1-k), sometimes referred to as Node-Bs, may provide connectivity to associated geographical areas within a wireless data network. Persons of ordinary skill in the art should appreciate that portions of such a wireless data network may be suitably implemented in any number of ways to include other components using hardware, software, or a combination thereof. Wireless data networks are known to persons of ordinary skill in the art and so, in the interest of clarity, only those aspects of a wireless data network that are relevant to the present invention will be described herein.

According to one embodiment, each mobile station 115 may communicate with an active base station 110 on the reverse link 120 via the radio network controller 130 coupled to the first and second base stations 110(1-k). Each mobile station 115 may communicate over the reverse link 120 with the active base station, which is generally referred to as the serving base station or the serving sector. The 3rd Generation Partnership Project (3GPP2) standard defines the role of a serving base station or a serving sector and a serving radio network controller based on 3GPP2 specifications.

In one embodiment, the reverse link 120 and the forward link 140 may be established on a plurality of channels. The channels, such as traffic and control channels may be associated with separate channel frequencies. For example, CDMA channels with associated channel number and frequency may form a wireless communication link for transmission of high-rate packet data. On the forward link 140, for example, the mobile station 115(1) may update the base station 110(1) with a data rate to receive transmissions on the traffic channel 162. The forward link 140 may use a Forward MAC Channel that includes four sub-channels including a Reverse Power Control (RPC) Channel, a Data Rate Control Lock (DRCLock) Channel, ACK channel and a Reverse Activity (RA) Channel.

On the reverse link 120, the mobile station 115(1) may transmit on an Access Channel or a Traffic Channel. The Access Channel includes a Pilot Channel and a Data Channel. The Traffic Channel includes Pilot, MAC and Data Channels. The MAC Channel comprises four sub-channels including a Reverse Rate Indicator (RRI) sub-channel that is used to indicate whether the Data Channel is being transmitted on the Reverse Traffic Channel and the data rate. Another sub-channel is a Data Rate Control (DRC) that is used by the mobile station 115(1) to indicate to the base station 110(1) the revised data rate 195 that the traffic channel 162 may support on the best serving sector. An acknowledgement (ACK) sub-channel is used by the mobile station 115(1) to inform the base station 110(1) whether the data packet transmitted on the traffic channel 162 has been received successfully. A Data Source Control (DSC) sub-channel is used to indicate which of the base station sectors should be transmitting forward link data.

In another embodiment, the mobile station 115(1) may request transmission of packet data, as shown in FIG. 1, from at least two cell sectors associated with one or more of the set of base stations 110(1-k). In one embodiment, the cellular system 100 may be based on a cellular network, which at least in part, may be based on a Universal Mobile Telecommunications System (UMTS) standard. The cellular network may be related to any one of the 2G, 3G, or 4G standards that employ any one of the protocols including the UMTS, CDMA2000, or the like, however, use of a particular standard or a specific protocol is a matter of design choice and not necessarily material to the present invention.

In one embodiment, a conventional Open Systems Interconnection (OSI) model may enable transmission of the packet data and other data including messages, packets, datagram, frames, and the like between the mobile station 115(1) and the set of base stations 110(1-k). The term "packet data" may include information or media content that has been arranged in a desired manner. The packet data may be transmitted as frames including, but not limited to, a radio link protocol (RLP) frame, signaling link protocol (SLP) frame or any other desired format. Examples of the packet data may include a payload data packet representative of voice, video, signaling, media content, or any other type of information based on a specific application.

Figure 2:
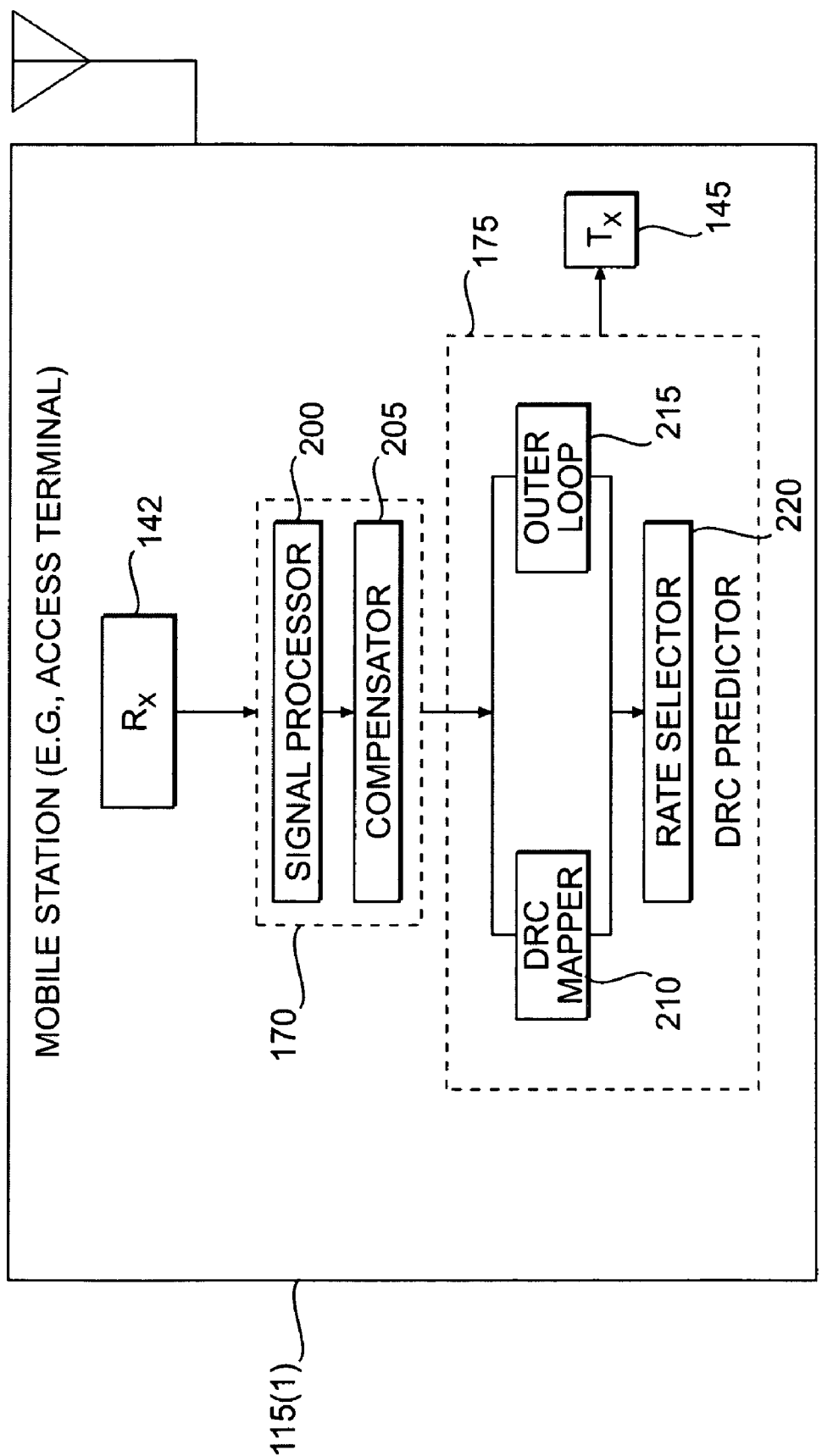
FIG. 2 schematically depicts the mobile station, such as an access terminal (AT) that adapts the initial data rate to obtain adjustment(s) and feedback a revised data rate to the base station in accordance with one illustrative embodiment of the present invention.

Referring to FIG. 2, one illustrative embodiment of the mobile station 115(1) includes the data rate adaptor 170 coupled to the DRC predictor 175 for enabling the data rate 185 selected by the mobile station 115(1) to converge to an optimal data rate, such as the revised data rate 195 corresponding to the power of the traffic channel 162 over the forward link 140. The data rate adaptor 170 may comprise a signal processor 200 to measure the signal to noise ratio (SNR) and/or a packet data rate (PER). The data rate adaptor 170 may further comprise a compensator 205 to use the compensation offset 190 shown in FIG. 1 for adjusting the measurement of a pilot, such as the primary pilot 187 and/or the secondary pilot.

In particular, the compensator 205 may compensate a difference between the secondary pilot C/I and the actual traffic channel 162 C/I transmitted to the mobile station 115(1). Consistent with one embodiment of the present invention, the mobile station 115(1) may be based on the 3GPP2 revision B standard in accordance with the SDMA protocol. In this case, the signal processor 200 may measure the signal to noise ratio or signal strength of the secondary pilot instead of the primary pilot 187. The compensation value 197 for the offset 190 may be determined by the base station 110(1) based on the number of spatial beams formed at the base station 110(1). The base station 110(1) may transmit the compensation value 197 over the forward link 140.

The DRC predictor 175 may predict a value for the data rate 185 based on the measurement of the secondary pilot strength and the compensation value 197. The DRC predictor 175 may comprise a DRC mapper 210 and an outer loop 215. The DRC mapper 210 and the outer loop 215 may couple to a rate selector 220 to select the revised data rate 195.

The DRC mapper 210 may adjust the relationship (i.e., C/I threshold margins) between the DRC values and particular signal-to-noise ratio values. While the outer loop 215 may determine a threshold offset to adjust a C/I threshold. The mobile station 115(1) may start with a set of pre-set threshold values to select the data rate 185. In a fading channel, the outer loop 215 may adapt the C/I threshold values to a changing channel condition. The C/I threshold may be adapted based on multiple factors including velocity of the mobile station 115(1), distance between the mobile station 115(1) and the base station 110(1) and fading between the mobile station 115(1) and the mobile station 115(1).

According to one embodiment, to adapt to one or more changing channel conditions, the outer loop 215 may dynamically adjust the offset of the C/I threshold to obtain a target packet error rate (PER). An exemplary adjustment by the outer loop 215 may include steps of defining the target PER of transmission as a PER_TARGET and an offset adjustment step size as an AJUST_STEP, at the end of a conventional Hybrid Automatic Request (HARQ) process: (1) If the packet is decoded successfully (by indication of a conventional cyclical Redundancy Checking CRC), decrease the offset of threshold by (AJUST_STEP *PER_TARGET) or (2) If the decoding of the packet fails, increase the offset of threshold by the AJUST_STEP.

In this way, when a DRC selection, i.e., the selected data rate 185 is based on the pilot 187 C/I that is determined to be lower than the actual traffic channel 162 C/I, the mobile station 115(1) may request a conservative data rate initially. This conservative data rate may result in a large or excess SINR of the received packet at the mobile station 115(1), indicating a higher chance of early termination of a multi-slot packet. At the same time, a successful CRC may trigger a threshold offset adjustment by the outer loop 215. As a result, the DRC selection may be selected aggressively to converge quickly with the DRC value based on the actual traffic channel 162 C/I value being used in the rate selection 220.

Additionally, the mobile station 115(1) based on the Revision B standard may use the secondary pilot and only use a fraction of the total available transmission power of the mobile station 115(1) and compensate the measurement of the pilot. In this case, if the traffic channel 162 C/I is determined to be lower than the compensated C/I of the pilot, a relatively more aggressive DRC value may be provided in the feedback 180. The outer loop 215 may trigger an adjustment to lower the future DRC value in the feedback 180, providing a faster convergence in this scenario.

One particular scenario may cause the mobile station 115(1) located at a fixed location within a sector associated with a conventional cell of the cellular system 100 may use the pilot (either primary or secondary depending on whether the mobile station 115(1) is a legacy or a Revision B type) C/I measurement to generate a DRC value. The DRC values may be feedback to the base station 110(1), and the base station 110(1) may schedule data transmission based the feedback 180. In another scenario, the mobile station 115(1) may select a DRC value based on the actual traffic channel C/I based on the ratio of pilot C/I vs. traffic C/I. In both scenarios, however, use of the SDMA protocol may significantly increase system spectral efficiency in addition to an increase in link peak data rate available in, for example, a multi-carrier transmission.

Accordingly, a DRC prediction at the mobile station 115(1) may be driven by the measurement of secondary pilot C/I. In other words, the cellular system 100 based on a SDMA protocol may avoid any degradation when compared with the cellular system 100 driven by the traffic channel 162 C/I. Moreover, the 3 dB drop of the primary pilot 187 and/or the secondary pilot C/I may not affect performance of a legacy mobile station 115(1).

Figure 3:
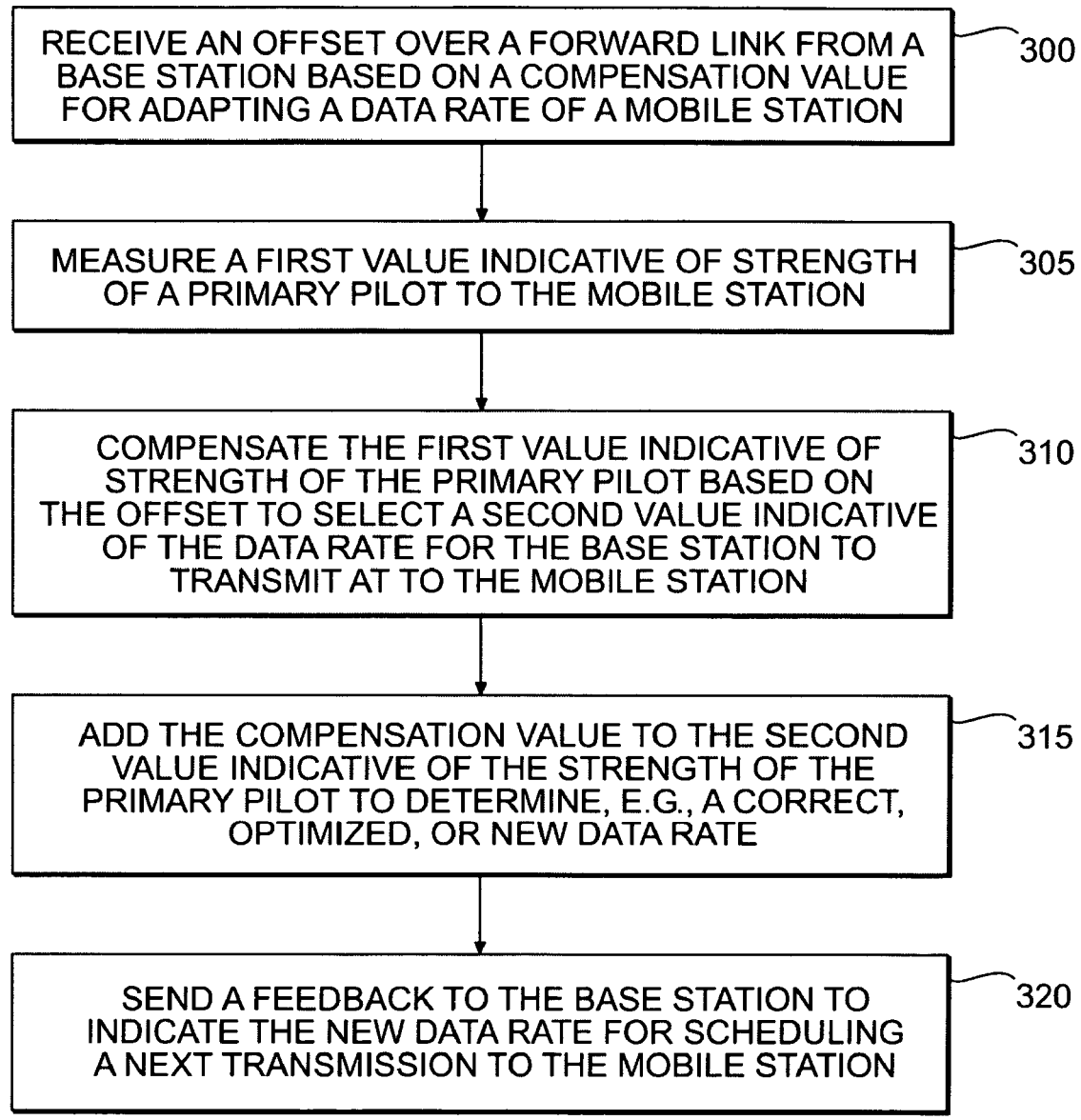
FIG. 3 depicts a stylized representation for implementing a method of adapting the initial data rate that a mobile station indicates to a base station for transmission on a forward link consistent with one exemplary embodiment of the present invention.

Referring to FIG. 3, a stylized representation for implementing a method of adapting the data rate 185 selected by the mobile station 115(1) for the base station 110(1) to transmit on the forward link 140 is illustrated consistent with one embodiment of the present invention. At block 300, the mobile station 115(1) may receive the compensation offset 190 over the forward link 140 from the base station 110(1). The mobile station 115(1) may receive the compensation offset 190 based on the compensation value 197 for adapting the data rate 185 of the mobile station 115(1). At block 305, the signal processor 200 at the data rate adaptor 170 may measure the first value 192(1) indicative of the strength of the primary and/or secondary pilot between the base station 110(1) and the mobile station 115(1).

More specifically, the compensator 205 at the data rate adaptor 170 may compensate the first value 192(1), at block 310. By compensating the first value 192(1) based on the compensation offset 190, the mobile station 110(1) may select the second value 192(2) using the rate selector 220 at the DRC predictor 175 for the base station 110(1) to transmit at a converged or an optimal data rate, i.e., the revised data rate 195 to the mobile station 115(1).

To determine, e.g., a correct, optimized, or new data rate 195, the compensator 205 adds the compensation value 197 to the second value 192(2) indicative of the strength of the primary pilot 187 and/or the secondary pilot. The transmitter 145, at block 320, may send the feedback 180 to the base station 110(1), indicating the revised data rate 195 for scheduling the next transmission 199 to the mobile station 115(1).

Figure 4:
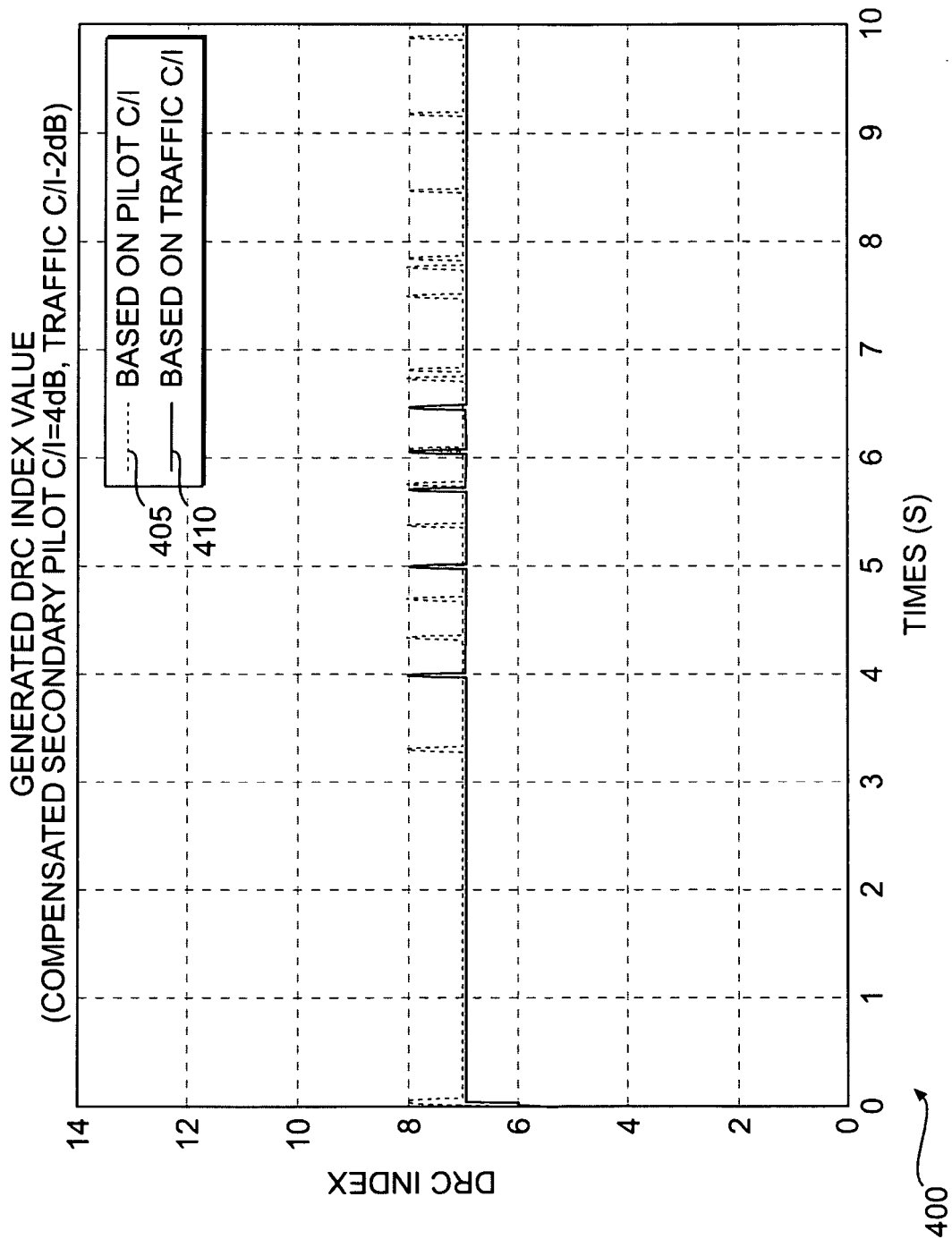
FIG. 4 illustrates a stylized representation of a chart for generating a value of a data rate control (DRC) by compensating a measurement of the strength secondary pilot relative to the measurement of the strength of the traffic channel in accordance with one embodiment of the present invention.

Referring to FIG. 4, a stylized chart 400 schematically depicts generating exemplary values for a DRC index over a period of time, e.g., 10 seconds in accordance with one embodiment of the present invention. The generated DRC index value may be based on the compensated secondary pilot C/I of 4 decibel (dB) and the traffic channel C/I of −2 dB. A first curve 405 depicts the secondary pilot C/I and a second curve 410 depicts the traffic channel C/I.

In particular, the first curve 405 indicates the data rate 185, which the mobile station 115(1) may initially select based on the measurement of the secondary pilot C/I. The second curve 410 indicates the measurement of the traffic channel 162 C/I based selection of the revised data rate 195. For example, when an optimized data rate may be at a DRC index value 7, the first curve 405 may be compensated to converge from the DRC index value 8 and stay converged to the second curve 410 based the optimal data rate. In other words, by compensating the measurement of the secondary pilot C/I within a few iterations of rate selection by the mobile station 115(1), such as 3 to 5 selections, the converged data rate may indicate the optimal data rate. The mobile station 115(1) may transmit the feedback 180 to the base station 110(1) to obtain the revised data rate 195.

Figure 5:
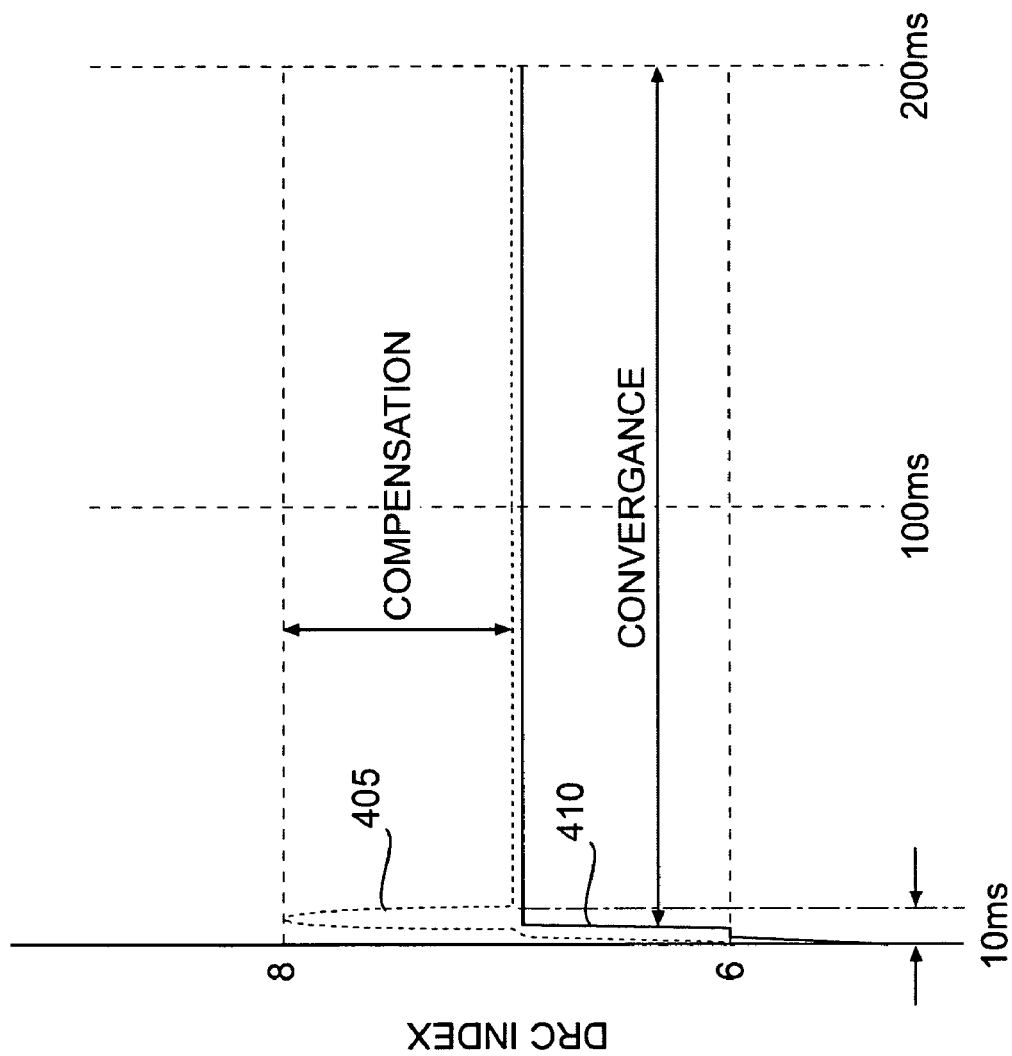
FIG. 5 illustrates a stylized representation of a chart to provide a relatively fast convergence for a selected data rate from two different pilot and traffic strength measurements in the cellular system based on a spatial division multiple access (SDMA) protocol.

Referring to FIG. 5, in one embodiment, the feedback 180 may be provided in every slot, such as a slot of 1.667 milliseconds. After a relatively small number of slots, for example, 5 to 10 slots, which may amount to 10 milliseconds, the first and second curves 405 and 410 may converge. Accordingly, the rate selected by the mobile station 115(1) may indicate a rate based on the actual traffic on the traffic channel 162, providing an optimized data rate for transmission on the forward link 140 by the base station 110(1) in the next scheduling session. The base station 110(1) may use the scheduler 165 to schedule the next transmission 199 to the mobile station 115(1) based on the data rate control (DRC) channel 182.

The Spatial Division Multiple Access (SDMA) protocol of Revision B may provide significant spectral efficiency improvements in cells, such as the suburban macro cells of the wireless communication system 100. The SDMA protocol generally enables two modes including an Open Loop (OL) and a Closed Loop (CL). In the open loop based SDMA protocol, an Access Network (AN) may allocate the pilot channel to the mobile station 115(1) via higher layer signaling, and in the closed loop SDMA protocol, the mobile station 115(1) signals to the network the best pilot channel.

To enable the use of the SDMA protocol, in one embodiment, one or more secondary pilots may cover a portion of the sector. In this scenario, the data rate (DRC) predictor 175 of the mobile station 115(1) may be based on measurement of secondary pilot strength. Even though some difference, e.g., as large as 6 dB, may exist between the secondary pilot C/I and the actual traffic channel 162 C/I transmitted to the mobile station 115(1) and for a legacy mobile station 115(1), the primary pilot 187 and/or the secondary pilot channel C/I may be 3 dB lower than the traffic channel 162 C/I, the DRC predictor 175 may provide a data rate control to adapt the transmitted data rate 185 in the forward link 140 to varying radio channel conditions.

When the mobile station 115(1) connects to the base station 110(1), the DRC predictor 175 may continuously measure at least one channel condition (i.e., received pilot 187 C/I) to determine a given maximum achievable data rate for the next transmission 199 on the forward link 140 of a next data packet. The mobile station 115(1) may transmit a data rate request to the access network (AN) on the reverse link 120 using the data rate control (DRC) channel 182 in 1, 2, 4 or 8 time slot intervals (e.g., where the duration of each slot may be 1.67 ms).

Upon the receipt of each new DRC request, the base station 110(1) may use the requested data rate 195 on the forward link 140 for the traffic channel 162 when transmitting packets to the mobile station 115(1) in a next scheduling time session. The DRC predictor 175 may include the DRC mapper 210 and the outer loop 215, as is shown in FIG. 2.

In one embodiment, the cellular system 100 may wirelessly communicate mobile data at a speed and coverage desired by individual users or enterprises. According to one embodiment, the high-speed wireless data network may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP) specifications. The UMTS also referred as Wideband Code Division Multiple Access (WCDMA) includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP2) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of adapting a data rate that a mobile station indicates to a base station for transmission on a forward link, wherein the base station is configured to transmit a primary pilot and at least one secondary pilot, the method comprising:
    measuring, at the mobile station, a first value indicative of strength of at least one of the primary and said at least one secondary pilot transmitted by the base station; and
    compensating said first value indicative of strength of said at least one of said primary and secondary pilot based on an offset to select a second value indicative of said data rate for said base station, wherein the base station determines the offset based upon a difference between at least one carrier-to-interference ratio (C/I) associated with said at least one secondary pilot and at least one traffic channel C/I.

2. The method, as set forth in claim 1, further comprising:
    receiving, at the mobile station, said offset to predict said second value indicative of said data rate.

3. The method, as set forth in claim 2, wherein receiving an indication of said offset further comprising:
    receiving an indication of said offset from said base station during an initial setup of said mobile station based on an antenna configuration of said base station.

4. The method, as set forth in claim 3, further comprising:
    causing said mobile station to set said offset based on a compensation value.

5. The method, as set forth in claim 4, further comprising:
    adding said compensation value to said second value indicative of the strength of said at least one of said primary and secondary pilot to determine a value indicative of said data rate during a working mode of said mobile station.

6. The method, as set forth in claim 5, further comprising:
    sending a feedback on a reverse link to said base station to indicate said value indicative of said data rate for scheduling of a next transmission to said mobile station.

7. The method, as set forth in claim 6, further comprising:
    in response to said feedback, receiving an indication for said data rate based on an instantaneous channel condition.

8. The method, as set forth in claim 7, further comprising:
    measuring said instantaneous channel condition for a traffic channel between said mobile station and said base station; and
    configuring at least one parameter at said mobile station to adjust said first value indicative of the strength of said at least one of said primary and secondary pilot for selecting a revised data rate based on said instantaneous channel condition.

9. The method, as set forth in claim 8, further comprising:
    selectively increasing said first value indicative of the strength of said at least one of said primary and secondary pilot to cause said mobile station to experience a stronger signal than indicated by said first value indicative of the strength of said at least one of said primary and secondary pilot.

10. The method, as set forth in claim 9, further comprising:
    causing said mobile station to select said revised data rate such that said second value indicative of said data rate is substantially similar to a desired data rate.

11. The method, as set forth in claim 10, further comprising: transmitting said revised data rate to said base station.

12. The method, as set forth in claim 3, further comprising:
    receiving only once said offset from said base station; and
    measuring the strength of said at least one of said primary and secondary pilot in at least two consecutive slots to obtain a converged data rate.

13. The method, as set forth in claim 12, further comprising:
    compensating said second value indicative of the strength of said at least one of said primary and secondary pilot interactively to cause said converged data rate to be substantially similar to an optimal data rate.

14. The method, as set forth in claim 13, further comprising:
    selecting said optimal data rate based on traffic in a traffic channel on a forward link to said mobile station.

15. The method, as set forth in claim 14, further comprising:
    causing a feedback on a data rate channel on a reverse link to converge to said optimal data rate based on power of said traffic channel.

16. A method of causing a first data rate selected by a mobile station to converge to a second data rate, the first data rate being selected for transmissions to the mobile station from a base station that is configured to transmit a primary pilot and at least one secondary pilot, the method comprising:
    determining, at the base station, an offset based upon a difference between at least one carrier-to-interference ratio (C/I) associated with said at least one secondary pilot and at least one traffic channel C/I
    transmitting an indication of the offset from the base station to said mobile station for compensating a measurement of at least one of a the primary pilot and said at least one secondary pilot.

17. The method, as set forth in claim 16, further comprising:
    determining a value for said offset based on a number of spatial beams formed at said base station.

18. The method, as set forth in claim 17, further comprising:
    transmitting said indication of offset, in a signaling message, to said mobile station over a forward link during setup of said mobile station.

19. The method, as set forth in claim 17, further comprising:
    periodically broadcasting a parameter for said offset in a signaling message.

20. The method, as set forth in claim 17, further comprising:

receiving feedback for data rate control over a reverse link on a data rate control channel; and in response to said feedback associated with said pilot based on spatial division multiple access, enabling said first data rate selected by said mobile station to converge to said second data rate based on power of a traffic channel on a forward link.

* * * * *